United States Patent Office 3,627,472
Patented Dec. 14, 1971

3,627,472
DYE POLYMER DYEING WITH A DIACRYL-
AMIDO - 4 - ANILINO-2-SULFONIC ACID-1-
AMINO-ANTHRAQUINONE
Brian Neville Parsons and Trevor James Smith, Manchester, England, assignors to Imperial Chemical Industries Limited, London, England
No Drawing. Filed Apr. 14, 1969, Ser. No. 816,039
Claims priority, application Great Britain, Apr. 17, 1968, 18,111/68
Int. Cl. C09b 3/60; D06p 3/24, 5/00
U.S. Cl. 8—4                                    10 Claims

ABSTRACT OF THE DISCLOSURE

A process for coloring fibers and films by treating them with a solution or suspension of a polymerizable anthraquinone dyestuff containing at least one aryloxy or arylamino residue. The treatment includes the use of a polymerization catalyst and provides dyeings and prints of high light fastness and fastness to wet treatments.

---

This invention relates to a coloration process and more particularly to a process for colouring fibrous materials and polymeric films with certain dyestuffs of the anthraquinone series.

According to the present invention there is provided a process for the coloration of fibrous materials or polymeric films which comprises treating the fibrous material or polymeric film with a solution or suspension of an anthraquinone dyestuff containing at least one aryloxy or arylamino residue and at least two groups of the formula:

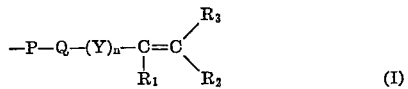

(I)

wherein $R_1$, $R_2$ and $R_3$ each independently represents a hydrogen atom or a methyl radical, P represents —O—, —N($R_4$)— or —N($R_4$)N($R_5$)— in which cases Q represents a direct link or a linkage of the formula —CO—, —COO—, —CONH—, or —CSNH— or P represents —CO— in which case Q represents —O—, —S—, or —N($R_4$)—, wherein each $R_4$ and $R_5$ independently represents hydrogen or optionally substituted lower alkyl, Y represents an optionally substituted alkylene radical and $n$ represents zero or 1, the treatment being carried out in conjunction with a polymerization catalyst.

It is preferred that the dyestuffs to be used in the process of the present invention contain from two to four groups of Formula I as hereinbefore defined. In addition to containing at least two groups of Formula I, the dyestuffs may contain one or more water-solubilising groups such as carboxylic acid and particularly sulphonic acid groups or they may be completely free of such groups.

Each of the groups of Formula I as hereinbefore defined is directly attached to a carbon atom present in the dyestuff. The said carbon atom may form part of an aryl residue present in the dyestuff or may form part of an alkyl chain which is either directly attached to an aryl residue present in the dyestuff or is attached to the aryl residue through a bridging atom or group. As examples of such bridging atoms or groups there may be mentioned —O—, —S—, —NH—,

—SO$_2$—, —SO$_2$NH— and —SO$_2$N-alkyl, wherein the alkyl residues may be optionally substituted.

The aryloxy and arylamino residues which may be present in the dyestuffs include phenoxy, substituted phenoxy, phenylamino and substituted phenylamino residues such as may commonly be found in dyestuffs of the anthraquinone series.

Particularly suitable dyestuffs to be used in the process of the present invention include dyestuffs of the formula:

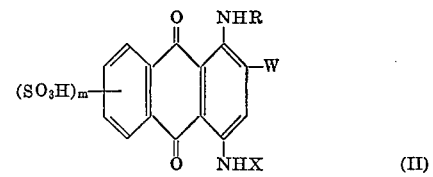

(II)

wherein $m$ represents zero or 1, R represents a hydrogen atom or an optionally substituted hydrocarbon radical, W represents a hydrogen or halogen atom or a sulphonic acid, carboxylic acid or optionally substituted alkyl, alkoxy, aryloxy, alkylthio, arylthio, alkylsulphonyl or arylsulphonyl radical with the proviso that one of R and W is hydrogen, X represents an optionally substituted aryl radical, and X and W between them carry at least two groups of the formula:

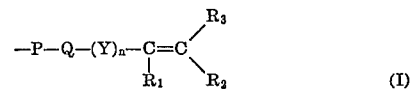

(I)

wherein $R_1$, $R_2$, $R_3$, P, Q, Y and $n$ have the meanings already stated.

Optionally substituted hydrocarbon radicals which may be represented by R in the dyestuffs of Formula II include alkyl radicals, particularly but not exclusively the lower alkyl radicals methyl, ethyl, propyl and butyl, aryl radicals such as phenyl, aralkyl radicals such as benzyl, and cycloalkyl radicals such as cyclohexyl. These hydrocarbon radicals may optionally be substituted by, for example, halogen atoms, hydroxy groups or alkoxy groups.

Halogen atoms which may be represented by W in the dyestuffs of Formula II include particularly but not exclusively chlorine and bromine atoms. Alkyl, alkoxy, alkylthio and alkylsulphonyl radicals which may be represented by W include particularly but not exclusively lower alkyl, lower alkoxy, lower alkylthio and lower alkyl sulphonyl radicals wherein the alkyl portion contains up to four carbon atoms. Aryloxy, arylthio and arylsulphonyl radicals which may be represented by W include phenoxy, phenylthio and phenylsulphonyl radicals. The various radicals may optionally be substituted by, for example, halogen atoms, hydroxy, alkyl or alkoxy groups or by one or more groups of the Formula I. The aryl radicals present in R and W may contain sulphonic acid or carboxylic acid groups.

Aryl radicals which may be represented by X include phenyl which may optionally be substituted by halogen atoms or alkyl, alkoxy, sulphonic acid or carboxylic acid radicals or by one or more groups of Formula I.

In the dyestuffs of Formula II the groups of Formula I are attached to carbon atoms in W and/or X or to carbon atoms of alkyl or aryl residues attached to W and/or X through a bridging atom or group such as —O—, —S—, —NH—,

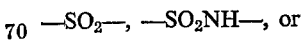

—SO$_2$—, —SO$_2$NH—, or

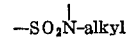

In the groups of Formula I present in the dyestuffs to be used in the process of the present invention it is preferred that $R_2$ and $R_3$ are hydrogen atoms and $R_1$ is a hydrogen atom or especially a methyl group. It is also preferred than $n$ is zero and —P—Q— is —OCO or especially —NR$_4$CO—, in which $R_4$ is a hydrogen atom or a lower alkyl group and it is further preferred that when $R_1$ is a methyl group $R_4$ is a hydrogen atom. Examples of particularly suitable groups of Formula I include acryloylamino, acryloyloxy, methacryloylamio and methacryloyloxy groups.

Preferred dyestuffs within the class having Formula II include those which may be represented by the following structural formulae:

(R'=H or lower alkyl, R"=H or CH$_3$ and R'''=H or SO$_3$H)

These dyes may be obtained by acylating an amino-containing anthraquinone dye base with a benzoyl or benzenesulphonyl chloride containing at least two amino group precursors, subsequently liberating the amino groups and then acylating with acryloyl or methacryloyl chloride.

Other preferred dyes include those having the general structural formula:

(R"=H or CH$_3$, R'''=H or SO$_3$H)

These dyes may be prepared by reacting 1-amino-4-bromoanthraquinone 2-sulphonic acid with the appropriate 4-β-acetylaminoethylaminoanline, hydrolysing and then acylating with acryloyl or methacryloyl chloride or by reacting 1-amino-4-bromoanthraquinone-2 sulphonic acid with the appropriate 4-N-(β-acryloyl- or methacryloyl-aminoethyl)-N-acryloyl or methacryloyl-aminoaniline.

Further preferred dyes within the scope of Formula II include those having the general structural formula:

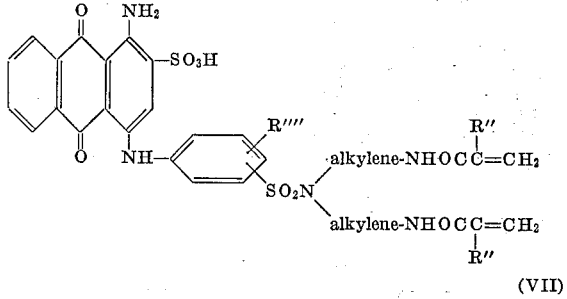

(R"=H or CH$_3$, alkylene=lower alkylene, especially ethylene or propylene, R''''=H or lower alkyl, and the —SO$_2$N< link is preferably meta to the —NH—.) Such dyes may be obtained by reacting for example 1-amino-4 (3'-chlorosulphonylanilino)anthraquinone - 2 - sulphonic acid with a di(ω-acetylaminoalkyl)amine, hydrolysing and then acylating with acryloyl or methacryloyl chloride.

Still further preferred dyes within the scope of Formula II include those having the general structural formula:

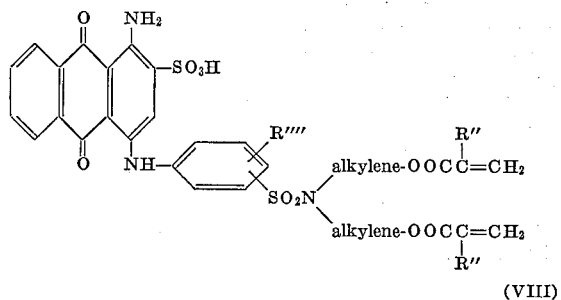

(R"=H or CH$_3$, alkylene=lower alkylene, especially ethylene or propylene, R''''=H or lower alkyl, and the SO$_2$N< link is preferably meta to the —NH—.) Such dyes may be prepared by reacting for example 1-amino-4 - (3' - chlorosulphonylanilino)anthraquinone-2-sulphonic acid with diethanolamine and acylating with acryloyl or methacryloyl chloride.

Other suitable dyestuffs within the scope of Formula II include the following:

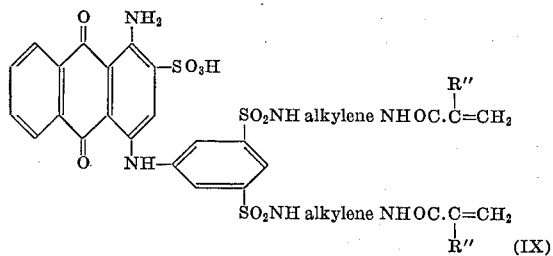

(where R"=H or Me and alkylene is lower alkylene especially ethylene or propylene) prepared by condensing 1 - amino - 4 - (3',5' - dichlorosulphonylanilino)anthraquinone-2-sulphonic acid with a lower alkylene diamine, and then acylating with acryloyl or methacryloyl chloride.

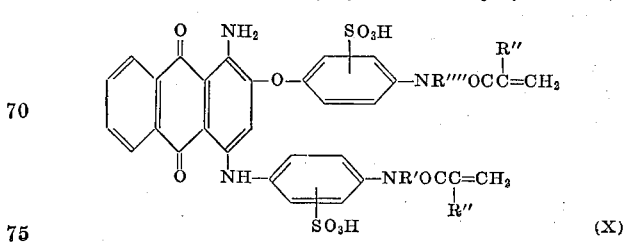

prepared by condensing 1-aminoanthraquinones containing the usual replaceable groups in the 2- and 4-positions with a p-phenylene diamine derivative followed by a p - aminophenol, sulphonating, liberating free amino groups as necessary by conventional means, and acylating with acryloyl or methacryloyl chloride.

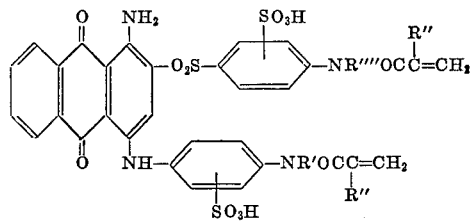

(XI)

prepared by condensing 1-amino-2-halogeno-4-(4'-optionally substituted aminoanilino)anthraquinones with sodium 4-acetylaminobenzenesulphinate or analogous compound in a solvent, e.g. dimethyl formamide, sulphonating and hydrolysing, and finally acylating with acryloyl or methacryloyl chloride.

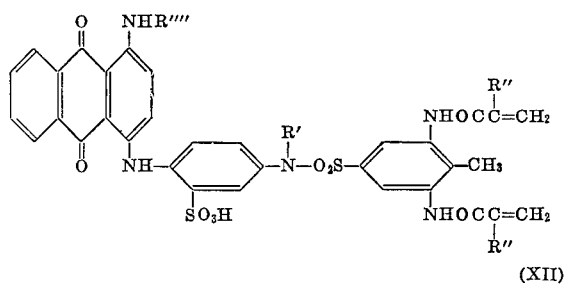

(XII)

(XIII)

(XIV)

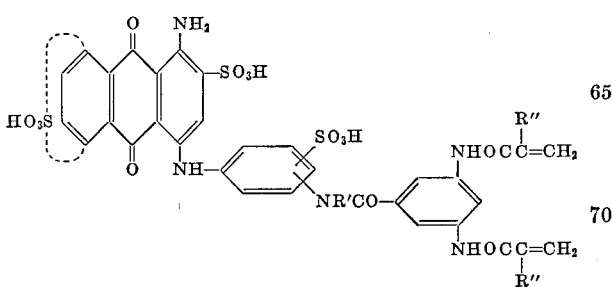

wherein the benzoylamino and sulphonic acid groups between them occupy the m and p positions relative to —NH—.

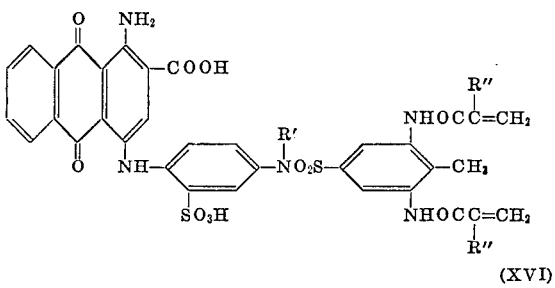

(XVI)

The dyes of Formulae XII–XVI, where R'=H or lower alkyl, R''=H or Me, R''''=H or lower alkyl, and hal= Cl or Br, may be prepared by reacting the appropriate amino-containing dye bases with a benzoyl or benzenesulphonyl chloride containing at least two amino group precursors, subsequently converting these into amino groups, and then acylating with acryloyl or methacryloyl chloride.

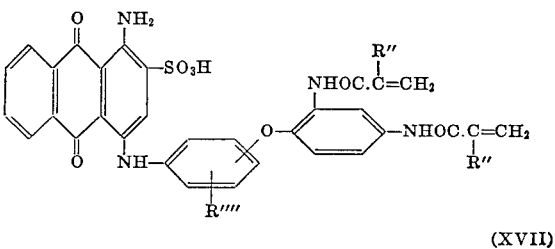

(XVII)

where R''=H or Me, R''''=H or lower alkyl, and the —O— link is preferably meta or para to the —NH— link. The dyes may be prepared by condensing 1-amino-4-4-bromoanthraquinone-2-sulphonic acid with the appropriate 2,4-dinitrophenoxyaniline, reducing the nitro groups with sodium sulphide in aqueous solution, and acylating the so obtained amino groups with acryloyl or methacryloyl chloride.

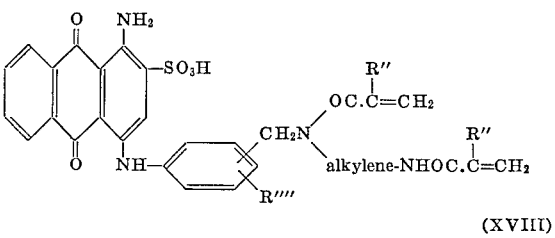

(XVIII)

where R''=H or Me, R'''=H or lower alkyl, alkylene= lower alkylene, and the —CH$_2$N< group is preferably meta- or para- to the —NH— link. These dyes may be prepared by condensing 1-amino-4-bromoanthraquinone-2-sulphonic acid with the appropriate m- or p-aminobenzyl-bisacryloyl- or bismethacryloylalkylene diamine.

Dyes not within the scope of Formula II which may be used in the process of the present invention include the following:

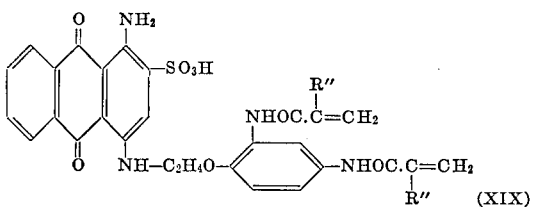

(XIX)

where R''=H or Me. These dyes may be prepared by condensing 1 - amino-4-bromoanthraquinone-2-sulphonic acid with β-(2,4-dinitrophenoxy)ethylamine, reducing the nitro groups with for example sodium sulphide, and then acylating the so obtained amino groups with acryloyl or methacryloyl chloride.

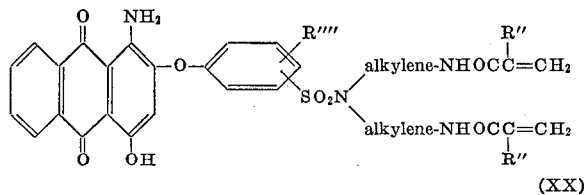

(XX)

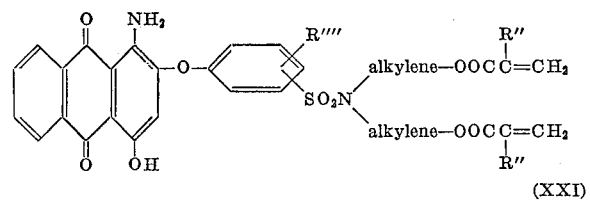

(XXI)

(R''=H or CH₃, R''''=H or lower alkyl, and alkylene= lower alkylene).

The dyes of Formulae XX and XXI may be prepared by reacting 1 - amino-4-hydroxy-2-(chlorosulphonylphenoxy)anthraquinones with di-(ω-acetylaminoalkyl)amine or diethanolamine, hydrolysing as necessary, and then acylating with acryloyl or methacryloyl chloride.

Fibrous materials which may be coloured by the process of the present invention using one or more of the dyestuffs include textile materials, leather and skins. Textile materials which may be so coloured include both natural and artificial textile materials, for example textile materials comprising natural cellulose fibres, for example cotton, flax, jute, hemp, sisal and ramie, regenerated cellulose fibres, for example viscose rayon and cuprammonium rayon, cellulose ester fibres, for example cellulose acetate and cellulose triacetate, natural protein fibres, for example wool, silk and mohair, regenerated protein fibres, synthetic polyamide fibres, for example nylon 66 and nylon 6 and modified synthetic polyamide fibres, aromatic polyester fibres, for example polyethylene terephthalate, and modified polyester fibres, polyacrylonitrile, modified polyacrylonitrile and polyurethane fibres. These materials may be in the form of loose fibres, slubbing, yarn or piece goods. Polymeric films which may be coloured include polyester, polyamide, polyimide, polyurethane and polyvinyl materials.

The suitability of a particular dyestuff for application to a particular substrate depends to a large extent upon the general structure of the dyestuff and not only on the presence of two or more groups of Formula I. The presence or absence of water-solubilising groups is one factor influencing the suitability of dyestuffs for particular substrates. Those dyestuffs which contain one or more water-solubilising groups, for example sulphonic acid groups, are particularly valuable for colouring cellulose textile materials, for example cotton, and polyamide textile materials, for example nylon and wool. The dyestuffs which contain no water-solubilising groups are particularly valuable for colouring polyethylene terephthalate textile materials, cellulose acetate including triacetate textile materials and synthetic polyamide textile materials, for example nylon.

The colouring process of the invention and/or the treatment with the polymerisation catalyst, particularly when used with hydrophobic polymeric materials, may be carried out with a carrier present. Suitable carriers include for example o-phenylphenol, p-phenylphenol, benzylalcohol, dichlorobenzene, trichlorobenzene, diphenyl, diphenylether, salicylic acid, o- and p-cyclohexyl phenol, β-naphthyl methyl ether, monochlorobenzene, α- or β-naphthol, methyl salicylate, phenyl salicylate, chloroform, and tetrachloroethane.

The coloration of textile materials or polymeric films according to the process of the present invention may be performed by suitably modifying conventional dyeing, padding and printing processes so as to permit the introduction, at some suitable stage, of a polymerisation catalyst. Whilst, as described below, many such modifications are possible, it is preferred to treat the substrate with the polymerisation catalyst after the application of the dyestuff or to apply the dyestuff together with a polymerisation catalyst and subsequently activate the polymerisation catalyst by heating, steaming or other means.

In the case of a dyeing process the polymerisation catalyst may be added to the dyebath at any convenient stage. Thus, it may be added at the start of the dyeing process or it may be added subsequently when partial or substantially complete absorption of the dyestuff on to the textile material has taken place. Alternatively, the dyeing process may be completed without a polymerisation catalyst being present and the textile material may be then immersed in a solution or suspension of the initiator in water or an organic solvent. If desired, treatment with the polymerisation catalyst may be completed by removing the textile material from the solution or suspension containing the polymerisation catalyst, optionally drying and then subjecting the textile material to storage, to heat and/or steam or other treatments to activate the polymerisation catalyst. Preferably, a temperature in the range of from 20° C. to 200° C. should be attained during treatment of the textile material with the polymerisation catalyst.

In a further variant, the polymerisation catalyst may be applied to the textile material before the dyeing process.

In the case of a printing process, the polymerisation catalyst may be included with a dyestuff containing at least two groups of Formula I in a printing plate which can be applied to a textile material which may subsequently be subjected to the action of heat and/or steam. Alternatively, a printing paste containing the dyestuff may be applied to a textile material which has been impregnated with a polymerisation catalyst, the textile material subsequently being subjected to the action of dry heat or saturated or superheated steam. In a further variation, a printing paste containing the dyestuff may be applied to a textile material which is subsequently immersed in a hot solution or suspension of the polymerisation catalyst or the printed textile material may be impregnated with a solution or suspension of the polymerisation catalyst and subsequently be subjected to the action of heat or steam.

The textile material may be printed with the printing paste containing one or more of the dyestuffs by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

In the case of a padding process, the textile material may be padded with a solution or dispersion containing the dyestuff and polymerisation catalyst, optionally dried, and then stored, heated and/or steamed, or subjected to other treatments to activate the catalyst. Alternatively, the textile may be padded with a solution or dispersion containing the dyestuff, dried optionally by heating, and then repadded with a solution or dispersion containing the polymerisation catalyst, optionally dried, and then stored, heated and/or steamed, or subjected to other treatments to activate the catalyst. Alternatively, the textile may be padded with a solution or dispersion of the polymerisation catalyst, dried, repadded with a solution or dispersion containing the dyestuff, optionally dried, and then stored, heated and/or steamed or subjected to other treatments to activate the catalyst.

As polymerisation catalyst, there is preferably used one or more of the free radical generating agents or systems such as have already been proposed as initiators for the polymerisation of ethylenically unsaturated compounds. Suitable agents include organic peroxy compounds such as peroxides, hydroperoxides, peracids, peresters and percarbonates, for example acetyl peroxide, propionyl peroxide, benzoyl peroxide, lauroyl peroxide, stearoyl peroxide, t-butyl peroxide, t-amyl peroxide, 4-chlorobenzoyl peroxide, 2,4-dichlorobenzoyl peroxide, methyl ethyl ketone peroxide, cyclohexanone peroxide, t-butyl hydroperoxide, cumene hydroperoxide, tetralin hydroperoxide, t-butyl perbenzoate, di-t-butyl diperphthalate, t-butyl peracetate, peracetic acid, perbenzoic acid, performic acid, di-isopropyl peroxydicarbonate and acetyl cyclohexane sulphonyl peroxide, azo compounds for example 1,1'-azobisisobutyronitrile, 4,4'-azobis-4-cyanopenanoic acid, 1,1'-azobis-1-cyanocyclohexane, 1,1'-azobis-1-cyclopropyl propionitrile, 1,1'-azobis-1,3-dimethylvaleronitrile and inorganic compounds such as hydrogen peroxide, ammonium persulphate, potassium persulphate, sodium persulphate, cerium ammonium nitrate and cerium ammonium sulphate. Other suitable free radical generating systems include redox systems. Suitable reducing agents for use in redox systems in conjunction with the appropriate oxidising agent include, for example, ferrous salts including ferrous sulphate and ferrous ammonium sulphate, ethylene diaminetetraacetic acid, metallic formaldehyde and acetaldehyde, sulphoxylates such as sodium formaldehyde sulphoxylate, sodium sulphite, sodium bisulphite, sodium metabisulphite, sodium hydrosulphite, sodium thiosulphate, sodium sulphide, sodium hydrogen sulphide, thioglycollic acid and its water-soluble salts, cysteine, oxalic acid, formic acid, tartaric acid, thiourea, thiourea dioxide, ascorbic acid, hydroxylamine, hydroxylamine salts such as the hydrochloride and sulphate, hydrazine, hydrazine salts such as the hydrochloride and sulphate, d-glucose, dextrin, glyoxal and sulphinic acids and mixtures of such agents. Suitable oxidising agents for use as the oxidising part of the redox system in conjunction with the appropriate reducing agent include for example, hydrogen peroxide, ammonium persulphate, sodium persulphate, potassium persulphate, potassium permanganate, potassium bromate, potassium chlorate, potassium perchlorate, ferric chloride, ethylene dibiguanide complex salt of tripositive silver and the various organic peroxy compounds listed above. Mixtures of oxidising agents may be used and there may also be used in conjunction with the redox systems, small amounts of activators for such systems, for example copper sulphate, hydroquinone and silver nitrate.

There may also be used other compounds known to act as initiators for the free radical polymerisation of ethylenically unsaturated compounds, for example diazonium compounds and stabilised diazonium salts, cobalt complexes such as dichloroaquotriamminocobalt chloride and trinitrotriamminocobalt, sulphinic acids such as benzene and p-toluene sulphinic acids, a transition metal carbonyl, for example molybdenum carbonyl, cobalt carbonyl and nickel carbonyl, optionally in conjunction with a phosphine, in conjunction with an organic halogen-containing compound, for example carbon tetrachloride, carbon tetrabromide, chloroform, bromoform and N-bromosuccinimide, N-nitrosoacylamines such as N-nitrosoacetanilide, N - nitrosocarbanilide, N,N'-dimethyl-N,N'-dinitrosoterephthalamide and N-chloro-p-toluenesulphonamide.

If desired, and when convenient, the use of chemical agents as free radical generating systems may be supplemented or replaced by the use of other means of generating free radicals. Thus, for example, a textile material to which a dyestuff of the present invention has been applied may be exposed to radiation from, for example, an ultraviolet, X-ray or gamma ray source or an electron beam.

The suitability of a particular polymerisation catalyst or catalyst system for use in the dyeing, padding and printing processes depends to a large extent upon the particular application process being employed, the temperature at which the process is being operated and also upon the textile material being coloured by the process of the invention. Thus in the dyeing, padding and printing application process in which hydrophobic textile materials, such as polyethylene terephthalate and cellulose triacetate textile materials are used, it is preferred to use organic peroxy or organic azo compounds as the polymerisation catalyst. For nylons and the more hydrophilic textile materials such as wool and cotton, organic peroxy or organic azo compounds may be used in dyeing, padding and printing processes but in batchwise dyeing processes it is preferred to use inorganic peroxy compounds such as hydrogen peroxide or persulphates and especially redox based on hydrogen peroxide or persulphates, such as potassium or ammonium persulphate.

The most suitable amount of polymerisation catalyst to use is usually in the range of from 1% to 500% by weight based on the weight of dyestuff used.

The process of the present invention provides dyeings and prints having high light fastness and remarkable fastness to wet treatments and it can be demonstrated that the latter is very largely due to the use of the polymerisation catalyst. In addition to the improved wet-fastness, the effect of the polymerisation catalyst can be demonstrated by solvent extraction of the coloured textile material or polymeric film. Resistance to solvent extraction is much higher in materials that have been treated with a polymerisation catalyst than in corresponding dyeings or prints that have not included such treatment.

The process of the present invention is particularly suitable for the coloration of cellulosic and polyamide textile materials.

In the coloration of natural and synthetic polyamide textile materials such as wool and nylon, it is preferred to apply water soluble dyestuffs containing not more than two and preferably only one sulphonic acid group by conventional dyeing procedures and then when substantially complete absorption of the dye has taken place to treat the dyed material with the polymerisation catalyst either in the same or a separate bath. In general for good levelling on polyamides it is preferred to use those dyes which are not excessively reactive (i.e. in the absence of the catalyst) towards the substrates in question and preferred dyes in this respect are those containing two methacryloylamino or two methacryloyloxy groups.

On polyamide textile materials the dyestuffs within the preferred classes produce level dyeings of valuable shades which are remarkably stable and fast to wet treatments and to light.

If desired, the process of the present invention may be carried out in the presence of one or more other compounds containing at least one olefinic group, polymerisable or copolymerisable by a free radical mechanism.

Examples of suitable polymerisable or copolymerisable monomers include α-olefins, vinyl aromatic compounds, for example styrene, halogenated styrene, α-methylstyrene, vinyltoluene and divinylbenzeen, α-β-unsaturated carboxylic acids, for example acrylic and methacrylic acids and the nitriles, amides and esters thereof, vinyl esters, vinyl ethers, vinyl ketones, vinyl chloride, vinylidene chloride, N-vinyl compounds, for example vinyl carbazole and vinyl pyrrolidone, unsaturated dicarboxylic acids, for example fumaric and maleic acids, and the esters and amides thereof, and dienes. Other useful monomers include other dyestuffs containing olefinic groups and compounds derived from phenols and aromatic amines and optionally containing one or more water-solubilising groups. Examples of such compounds include 4-acryloylaminobenzoic acid, N-acryloylaniline-3- or 4-sulphonic acid, acryloylaminonaphthol sulphonic acids and pentadienoylamino naphthol sulphonic acids. Polymerisable monomers of these types may be included in the dyebath or printing paste together with the dyestuffs and other ingredients.

In a modification of the process of the present invention, anthraquinone dyestuffs either containing no water-solubilising groups or containing water-solubilising groups, optionally in the form of heavy metal salts such as barium, calcium, strontium or manganese salts, and containing at least one aryloxy or arylamino residue and at least two groups of Formula I, may be treated with polymerisation catalysts in the absence of substrates to give coloured homopolymers or by using co-polymerisable monomers which may optionally be dyestuffs, coloured copolymers. The dyestuffs may be polymerised using the general methods described in the prior art, for example bulk, solution, emulsion or suspension polymerisation methods. The usual polymerisation catalysts may be employed such as those already mentioned herein or high-energy radiation and there may also be used other conventional auxiliary agents such as emulsifiers, protective colloids, thickeners, anti-foam agents, chain-transfer agents, and buffers.

The most suitable amount of polymerisation catalyst to use under these conditions is usually in the range of from 0.005% to 20% by weight based on the weight of dyestuff. The polymerised dyestuffs may be obtained in the form of powders, granules, or lumps and may be used for the production of pigments and shaped articles of various types. The new polymeric colouring matters, either singly or in mixtures, in the form of dry powders may be used as pigments for the coloration of paints, giving red to blue shades of good fastness, particularly to solvents, when incorporated in alkyd and melamine resins and other paint media. Alternatively the colouring matters may be used as pigments for the coloration of artificial polymeric materials, for example polyvinyl chloride, polyethylene, polystyrene, or cellulose acetate.

By milling the new colouring matters with water and a dispersing agent, for example disodium dinaphthylmethane-di-$\beta$-sulphonate, the colouring matters may be obtained in the form of pigment pastes suitable for the manufacture of emulsion paints, for the coloration of wall paper, for textile printing, for the coloration of paper and paper laminates, for flushing into paint vehicles or lithographic varnish or for use in the mass pigmentation of fibre forming materials such as viscose. In these applications, they are notable for their fastness to solvents.

The invention is illustrated but not limited by the following examples in which all parts are by weight.

EXAMPLE 1

100 parts of thionyl chloride are added to 79 parts of 1 - amino - 4 - anilinoanthraquinone - 2,3'-disulphonic acid dissolved in 500 parts of chlorosulphonic acid at 0–5° C. The solution is stirred for 16 hours at 20–25° C., for 1 hour at 30–35° C. and then cooled to 0–5° C. before drowning into a well-stirred mixture of 1500 parts of 36° Tw hydrochloric acid and 3000 parts of ice. The precipitate is filtered off, washed on the filter with 2 N hydrochloric acid followed by N hydrochloric acid, and pulled dry. The filter-cake is suspended in 300 parts of ice-water and slowly charged to a solution of 150 parts of di-($\beta$-acetylaminoethyl)amine in 750 parts of water at 5–10° C., maintaining a pH of 8.2–8.5 by the simultaneous addition of 2 N sodium hydroxide solution, and the reaction-mixture is stirred overnight at 20–25° C. The pH is adjusted to 7.0 with dilute hydrochloric acid and the solution is warmed to 40° C. before filtering. The filtrates are strongly acidified with concentrated hydrochloric acid and the precipitate is filtered off, washed with 2 N hydrochloric acid, and suspended in 1000 parts of 2 N hydrochloric acid. The suspension is filtered and the product washed on the filter with further acid and dried at 40° C.

80 parts of the 1-amino-4-[3'-(N,N-bis-$\beta$-acetylaminoethyl)aminosulphonylanilino]anthraquinone - 2 - sulphonic acid so obtained are dissolved in 400 parts of water at the boil and 800 parts of an aqueous solution containing 168 parts of naphthalene-1-sulphonic acid and 76 parts of sulphuric acid are added. The mixture is stirred at the boil under reflux for 18 hours, cooled to 20° C. and the precipitate is filtered off, washed with dilute hydrochloric acid, resuspended in 800 parts of water at 60° C. and made neutral by the addition of dilute sodium carbonate solution. The product is filtered off, washed on the filter with 5% aqueous sodium chloride solution and dried at 70° C.

A suspension of 12.5 parts of the sodium 1-amino-4-[3' - (N,N - bis - $\beta$ - aminoethyl) aminosulphonylanilino] anthraquinone-2-sulphonate so obtained is gravel-milled overnight in 400 parts of water containing an anionic dispersing agent. The material is sieved from the gravel which is washed with 200 parts of water. The stirred suspension is diluted with 600 parts of acetone, cooled below 10° C. and the pH adjusted to 7–8 with 2 N sodium carbonate solution. A solution of 43 parts of acryloyl chloride in 90 parts of acetone is run in dropwise at 5–10° C. with the pH maintained at 7–8 by the simultaneous addition of 2 N sodium carbonate solution. The solution is stirred overnight at 20–25° C. with the acetone evaporating and the product is precipitated by salting to 10% strength. The dyestuff is filtered off, washed on the filter with a little 10% aqueous sodium chloride solution, and redissolved in 1000 parts of water. The solution is adjusted to neutrality, 100 parts of sodium chloride are added, and the precipitated dyestuff is filtered off, washed with 5% aqueous sodium chloride solution, and dried in vacuo over phosphorus pentoxide to yield sodium 1-amino - 4[3' - (N,N - bis - $\beta$ - acryloylaminoethyl) aminosulphonylanilino]anthraquinone-2-sulphonate.

The dye is applied to mercerised cotton cloth from a padding liquor, prepared from 0.3 part of dye, 3 parts of urea and 27 parts of water. The cloth is squeezed, to remove excess dye liquor, is dried slowly at room temperature and is steamed for 2 minutes at 102° C. The cloth is then passed through a second padding liquor, prepared from 0.6 part of 20 volume hydrogen peroxide, 0.02 part of thiourea, 2 parts of sodium chloride and 18 parts of water. The cloth is squeezed to remove excess padding liquor and is dried at room temperature. It is then steamed for 10 minutes at 102° C. Finally the cloth is washed at 100° C. for 10 minutes, rinsed, and dried. A bright reddish blue dyeing is obtained in very good fixation, possessing excellent fastness to severe washing. If the hydrogen peroxide and thiourea are omitted from the second padding liquor, less dyestuff is retained on the fabric when it is washed.

EXAMPLE 2

A padding liquor is prepared from 0.4 part of the dyestuff of Example 1, 4 parts of urea, and 40 parts of water. Bleached, unmercerised cotton fabric is padded through this padding liquor and is squeezed to remove excess liquor. It is then dried by hanging at room temperature. The fabric is then passed through a second padding liquor prepared from 0.075 part of di-t-butyl diperphthalate dissolved in 30 parts of acetone. The fabric is squeezed to remove excess liquor and is dried by hanging at room temperature. It is then steamed for 10 minutes at 103° C. and is washed at the boil for 10 minutes in a solution of 2 parts of nonionic detergent in 1000 parts of water. It is finally rinsed and dried.

A reddish-blue dyeing is obtained, with good fixation, relative to the dyestuff originally applied. The dyeing has very good fastness to washing. If the di-t-butyl diperphthalate is omitted from the second padding liquor, very little dyestuff is retained on the fabric when it is washed.

Alternatively, the second padding liquor may consist of:

| | Parts |
|---|---|
| 0.075 part of di-t-butyl diperphthalate 5% acetone solution | 1.5 |
| Anhydrous sodium carbonate, 10% solution in water | 6 |
| Sodium chloride, 20% w./v. solution in water | 22 |

The fabric is processed as in the above example and very good fixation is obtained of the dye applied. The dyeing has very good fastness to washing.

If the di-t-butyl diperphthalate and sodium carbonate are omitted from the second padding liquor, very little fixation of dyestuff is obtained.

EXAMPLE 3

A padding liquor is prepared from 1 part of the dyestuff of Example 1, 2.5 parts of urea, 0.19 part of 4,4'-azobis(4-cyanopentanoic acid), and 50 parts of water.

Woven bleached cotton fabric (known as "Indian Head") is passed through this padding liquor and is squeezed to remove excess liquor. It is dried by hanging at room temperature and is then steamed at 102° C. for 10 minutes. The cotton fabric is washed at 100° C. in water containing 2 parts per thousand of a non-ionic detergent for 10 minutes and is rinsed and dried. Very high fixation of the dye applied is obtained. The cotton is dyed a bright reddish blue shade having excellent fastness to washing. If the 4,4'-azobis(4-cyanopentanoic acid) is omitted, inferior fixation of the dye is obtained.

In place of the 0.19 part of 4,4'-azobis(4-cyanopentanoic acid) used in this example there is used 0.125 part of di-t-butyl diperphthalate when a similar fast reddish-blue dyeing is obtained.

EXAMPLE 4

The dyestuff having the formula:

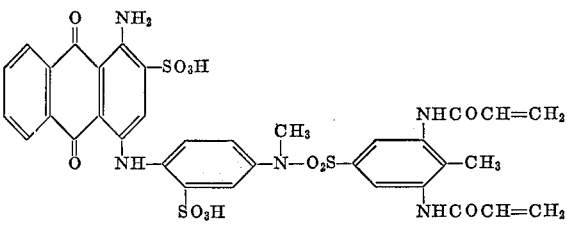

is applied to mercerised cotton by the methods of Examples 1, 2 and 3. Blue dyeings are obtained with good fixation, relative to the dye originally applied. The dyeings have excellent fastness to severe washing.

The dyestuff used in this example may be prepared by the following method:

A solution of 9.0 parts of acryloyl chloride is 60 parts of acetone is added dropwise at 5–10° C. to a stirred solution of 8.0 parts of 1-amino-4-[4'-N-(3'',5''-diamino-4'' - methylbenzenesulphonyl) - N - methylaminoanilino] anthraquinone-2,2'-disulphonic acid in a mixture of 200 parts of water and 200 parts of acetone with the pH maintained at 7–8 by the simultaneous addition of 2 N sodium carbonate solution. The solution is stirred overnight at 20–25° C. with the acetone evaporating and the dyestuff is precipitated by salting to 25% strength, filtered off, and resuspended in 500 parts of water. The suspension is filtered off, washed with 20% aqueous sodium chloride solution, and dried.

The dye base used above is prepared by dissolving 36 parts of disodium 1 - amino - 4 - (4'-methylaminoanilino) anthraquinone-2,2'-disulphonate and 9.3 parts of sodium acetate in 500 parts of water at 30° C. 0.5 part of Calsolene oil is added and 20.5 parts of 2,6-diacetylamino-toluene - 4 - sulphonyl chloride are slowly charged. The solution is stirred overnight at 30° C. and is filtered. The filtrates are salted to 30% strength and the precipitate is filtered off and washed well with 30% aqueous sodium chloride solution. The filter-cake is dissolved in 650 parts of water at 80° C. and 400 parts of 2 N hydrochloric acid are added. The mixture is stirred at the boil under reflux for 5 hours and then overnight with cooling to 20–25° C. The precipitated dye base is filtered off, washed well with 2 N hydrochloric acid, and dried.

The disodium 1 - amino - 4 - (4'-methylaminoanilino) anthraquinone - 2,2' - disulphonate is obtained from 1-amino - 4 - (4'-N-acetyl - N - methylaminoanilino)anthraquinone - 2 - sulphonic acid by hydrolysing with an aqueous solution of naphthalene - 1 - sulphonic acid and sulphuric acid as described in Example 1 and subsequently sulphonating in weak oleum.

EXAMPLE 5

A print paste is prepared according to the following method:

0.8 part of the condensate of 1 mole of cetyl alcohol and 27 moles of ethylene oxide, 5 parts of urea, and 0.5 part of the dyestuff of Example 4 are dissolved in 11 parts of water. To this is added a mixture of 2.5 parts of a 5% solution of di-t-butyl diperphthalate in acetone and 30 parts of white spirit, whilst stirring at high speed. A viscous print paste is thus formed which is applied to mercerised cotton fabric from an engraved roller. The fabric is dried, steamed at 100° C. for 10 minutes, and then washed at 100° C. in water containing 2 parts per thousand of a synthetic detergent for 10 minutes. The printed fabric is then rinsed and dried.

A bright blue print having excellent fastness to washing is obtained in high fixation.

EXAMPLE 6

0.3 part of the dyestuff having the formula:

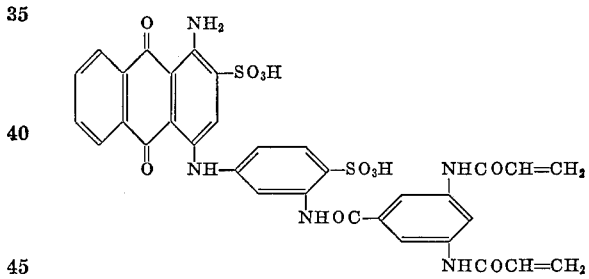

is applied to mercerised cotton by the method of Example 1, except that in place of the second padding liquor there is used a solution of 0.05 part of 4,4' - azobis(4-cyanopentanoic acid) dissolved in 20 parts of acetone.

A blue dyeing is obtained with very good fixation of dye, relative to the dye originally applied. The dyeing has very good fastness to severe washing. If the 4,4'-azobis(4-cyanopentanoic acid) is omitted from the second padding liquor, less dyestuff is retained on the fabric when it is washed.

The dyestuff of this example is also applied to cotton fabrics by the methods of Examples 2 and 3 to give fast blue dyeings.

The dyestuff used in this example may be prepared by the following procedure:

A solution of 20.75 parts of 1-amino - 4 - (3'-aminoanilino)anthraquinone - 2,4' - disulphonic acid in a mixture of 300 parts of water and 300 parts of acetone is cooled to below 10° C. and a solution of 23.0 parts of 3,5-dinitrobenzoyl chloride in 75 parts of acetone is slowly run in with the simultaneous addition of 2 N sodium carbonate solution to maintain a pH of 7–8. The mixture is stirred for 16 hours at 20–25° C. and the precipitated colour filtered off and resuspended in 500 parts of water. The pH is adjusted to neutrality and 50 parts of salt are added. The product is filtered off, washed with a little 5% aqueous sodium chloride solution, and dried.

A solution of 8.8 parts of the disodium 1 - amino-4-[3'-(3",5" - dinitrobenzoylamino)anilino]anthraquinone-2,4'-disulphonate so obtained in 200 parts of water at 60° C. is made alkaline to Brilliant Yellow with 2 N sodium hydroxide solution and a solution of 14.5 parts of sodium sulphide crystals in 30 parts of water added. The solution is stirred at 60–65° C. for 1½ hours and then cooled to 20° C. The pH is adjusted to neutrality with hydrochloric acid and 60 parts of salt are added. The isolated product is redissolved in 700 parts of water at 40° C. and pH 11–12. The solution is filtered and the filtrates are acidified to pH 4 with hydrochloric acid, salted to 30%, and the so-obtained precipitate is filtered off, washed on the filter with 10% aqueous sodium chloride solution, and dried.

A solution of 4.8 parts of acryloyl chloride in 25 parts of acetone is run at below 10° C. and pH 7–8 into a stirred solution of 5.3 parts of the disodium 1-amino-4-[3'-(3",5"-diaminobenzoylamino)anilino]anthraquinone - 2,4'-disulphonate thus obtained in a mixture of 150 parts of water and 150 parts of acetone. The pH is maintained at 7–8 by the simultaneous addition of 2 N sodium carbonate solution and the solution is stirred overnight at 20–25° C. with the acetone evaporating. The dyestuff is filtered off, resuspended in 500 parts of water, and the pH adjusted to neutrality with dilute hydrochloric acid. The product is filtered off, washed on the filter with a little 5% aqueous sodium chloride solution, and dried in vacuo over phosphorus pentoxide to give disodium 1-amino-4-[3' - (3",5" - bisacryloylaminobenzoylamino)anilino]anthraquinone-2,4'-disulphonate.

In place of the dyestuff used in this example there is used 0.3 part of 1-amino-4-[4'-(3",5"-bisacryloylaminobenzoylamino)anilino]anthraquinone - 2,3' - disulphonic acid when a greener blue dyeing having very good fixation is obtained. The dyeing has very good fastness to severe washing. This dyestuff is prepared by the method described above wherein the 1-amino-4-(3'-aminoanilino)anthraquinone - 2,4' - disulphonic acid is replaced by 20.75 parts of 1-amino-4-(4'-aminoanilino)anthraquinone-2,3'-disulphonic acid.

EXAMPLE 7

0.0375 part of the dye:

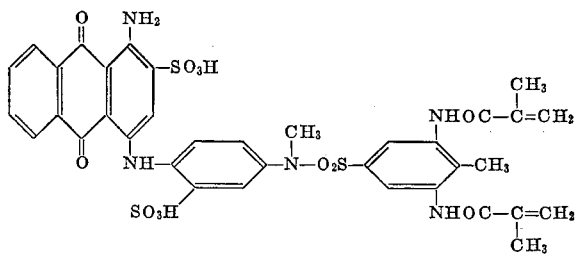

and 0.15 part of ammonium acetate are dissolved in 150 parts of water. 5 parts of wet-out wool serge fabric are introduced into this dyebath and the fabric is agitated while the temperature is raised to 100° C. The dyebath is boiled for 30 minutes and the dye is exhausted by an addition of 0.3 part of acetic acid.

The dyebath is boiled for a further period of 10 minutes, then cooled to 70° C., and an addition is made of 1 part of 20 vol. hydrogen peroxide and 0.14 part of thiourea. The dyebath is boiled for a further period of 30 minutes, then the wool fabric is rinsed in hot water and dried. It is dyed a blue shade, with superior fastness to I.S.O. Wash Test No. 3 and to I.S.O. Perspiration Test pH 8, compared with a similar dyeing carried out without addition of hydrogen peroxide and thiourea.

In place of the additions of hydrogen peroxide and thiourea to the dyebath in this example there are made additions of 0.075 part of sodium metabisulphite followed by 0.075 part of ammonium persulphate. A blue dyeing is obtained with superior fastness to wet treatments compared with a similar dyeing carried out without the addition of sodium metabisulphite and ammonium persulphate.

The dyestuff used in this example may be prepared by the method of Example 4, wherein the 9.0 parts of acryloyl chloride are replaced by 10.5 parts of methacryloyl chloride.

EXAMPLE 8

0.0375 part of the dye:

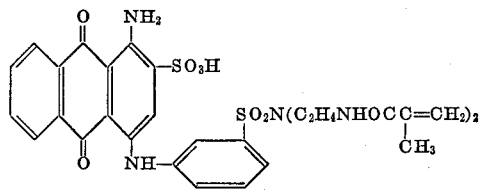

0.1 part of oleyl sodium sulphate and 0.15 part of ammonium acetate are dissolved in 150 parts of water. 5 parts of bulked nylon 6 fabric or bulked nylon 66 fabric (known commercially as "Banlon") are introduced into the dyebath and agitated until the temperature of the bath reaches 100° C. It is maintained at 100° C. for 30 minutes and an addition is then made of 0.3 part of acetic acid. Boiling is continued for 10 minutes.

The dyebath is then cooled to 70° C. and 0.075 part of sodium metabisulphite and 0.075 part of ammonium persulphate are added. The temperature is raised to 100° C. again, and treatment is carried out for 20 minutes at 100° C. The bulked nylon fabric is finally rinsed in hot water and dried.

It is dyed a bright reddish blue shade. The dyed fabric has a much superior fastness to I.S.O. Wash Test No. 4 than a similar dyeing to which the sodium metabisulphite and ammonium persulphate have not been added.

The dyestuff used in this example may be prepared from 12.5 parts of sodium 1-amino-4-[3'-(N,N-bis-β-aminoethyl)aminosulphonylanilino]anthraquinone - 2 - sulphonate by acylating with 52 parts of methacryloyl chloride in place of the 43 parts of acryloyl chloride used in Example 1.

EXAMPLE 9

0.05 part of the dyestuff described in Example 8 and 0.15 part of ammonium acetate are dissolved in 150 parts of water. 5 parts of bulked nylon 66 fabric (known commercially as "Banlon") or 5 parts of bulked nylon 6 fabric are introduced into this dyebath and agitated while the temperature of the bath is raised to 100° C. The temperature of the bath is maintained at 100° C. for 30 minutes, and the dyebath is then exhausted by an addition of 0.15 part of glacial acetic acid. The dyebath is boiled for 10 minutes and is then cooled to 70° C. An addition is made of 0.075 part of sodium metabisulphite followed by 0.075 part of ammonium persulphate. The temperature of the bath is raised to 100° C. and treatment is continued at 100° C. for 20 minutes. The nylon fabric is then removed, rinsed, and dried. A bright blue dyeing is obtained, which possesses superior fastness to wet treatments compared with a similar dyeing in which the sodium metabisulphite and ammonium persulphate are omitted.

In place of the quantities of sodium metabisulphite and ammonium persulphate used in the above example there may also be used 0.07 part of sodium metabisulphite and 0.05 part of ammonium persulphate.

In place of the additions of sodium metabisulphite and ammonium persulphate to the exhausted dyebath, the dyed nylon fabric may be removed from the exhausted dyebath, optionally rinsed, and then placed in a fresh bath, containing 150 parts of water together with the quantities of sodium metabisulphite and ammonium persulphate as set out above. The fresh bath is then raised to the boil and treatment is continued for 20 minutes. The fabric is then removed, rinsed, and dried.

EXAMPLE 10

100 parts of wool fabric is dyed for 60 minutes at 100° C. in a solution of 1 part of the dyestuff described in Example 8, 3 parts of concentrated sulphuric acid, and 5 parts of anhydrous sodium sulphate in 3000 parts of water. The dyebath is then cooled to 70° C. and an addition is made of 1 part of sodium metabisulphite followed by 1 part of ammonium persulphate. The bath is raised to 100° C. and treatment is continued for 20 minutes at 100° C. The wool fabric is then removed, rinsed, and dried. A bright blue dyeing is obtained, which possesses superior fastness to washing and perspiration compared with a similar dyeing in which the sodium metabisulphite and ammonium persulphate are omitted.

In place of the quantities of sodium metabisulphite and ammonia persulphate used in the above example there may also be used 1.5 parts of each of these reagents.

In place of the sodium metabisulphite and ammonium persulphate additions to the dyebath there may be added: 1 part of 20 volume hydrogen peroxide and 0.8 part of thiourea, when a bright blue dyeing having good wet fastness properties is obtained.

In place of the additions of sodium metabisulphite and ammonium persulphate or hydrogen peroxide and thiourea to the exhausted dyebaths as described above, the dyed wool fabric may be removed from the exhausted dyebath, optionally rinsed, and then placed in a fresh bath, containing 3000 parts of water together with the quantities of sodium metabisulphite and ammonium persulphate or hydrogen peroxide and thiourea and sulphuric acid as set out above. The fresh bath is then raised to the boil and treatment is continued for 20 minutes. The fabric is then removed, rinsed, and dried. Dyeings are obtained which have similar fastness properties to those where the reagents are added to the exhausted dyebath.

EXAMPLE 11

The dye from Example 1 is applied by the methods of Examples 8 and 9 to bulked nylon 6 fabric or bulked nylon 66 fabric. Blue dyeings are obtained with excellent fastness to I.S.O. Wash Test No. 4.

EXAMPLE 12

The dye from Example 1 is applied by the methods of Examples 7 and 10 to wool fabric. Blue dyeings are obtained with very good fastness to wet treatments.

EXAMPLE 13

1-amino - 4 - [4' - N - (3",5"-bismethacrylolyamino-4"-methylbenzenesulphony) - N - methylaminoanilino] anthraquinone-2-sulphonic acid is applied to wool by the methods of Examples 7 and 10 to give fast blue dyeings. The dyeings show superior fastness to wet treatments compared with similar dyeings in which the ammonium persulphate and sodium metabisulphite or the hydrogen peroxide and thiourea are omitted.

The dyestuff used in this example is prepared by condensing 1 - amino - 4 - (4' - methylaminoanilino) anthraquinone-2-sulphonic acid with 2,6-diacetylamino-toluene-4-sulphonyl chloride in aqueous acetone solution, hydrolysing the acetylamino groups with dilute hydrochloric acid, and acylating with methacryloyl chloride in aqueous actone in analogous procedures to those described in Example 4.

EXAMPLE 14

The dyestuff of Example 13 is applied to bulked nylon 66 fabric or bulked nylon 6 fabric by the methods of Examples 8 and 9 to give blue dyeings which show superior fastness to wet treatments compared with similar dyeings in which the sodium metabisulphite and ammonium persulphate are omitted.

In place of the dyestuff used in this example there is used 1-amino - 4 - [4' - N - (3",5"-bisacryloylamino-4"-methylbenzenesulphonyl) - N - methylaminoanilino] anthraquinone-2-sulphonic acid when similar fast blue shades are obtained. This dyestuff is prepared by the method described in Example 13 wherein the methacryloyl chloride is replaced by an equivalent amount of acryloyl chloride.

EXAMPLE 15

1 - amino - 4 - [4' - N - (3",5" - bisacryloylamino-benzoyl) - N-methylaminoanilino]anthraquinone - 2,3'-disulphonic acid is applied to cotton fabric by the methods described in Examples 1, 2, and 3 to give fast reddish blue shades.

The dyestuff used in this example is prepared by the method described in Example 6 wherein the 1-amino-4-(3' - aminoanilino)anthraquinone - 2,4' - disulphonic acid is replaced by an equivalent amount of 1-amino-4-(4' - methylaminoanilino)anthraquinone - 2,3' - disulphonic acid.

EXAMPLE 16

Wool fabric is dyed with 1 - amino - 4 - [4' - (3", 5" - bismethacryloylaminobenzoylamino)anilino]anthraquinone-2-sulphonic acid by the methods described in Examples 7 and 10 to give greenish-blue shades having very good fastness to wet treatments.

The dyestuff of this example is also applied to nylon fabrics by the methods described in Examples 8 and 9 to give greenish-blue shades having very good fastness to wet treatments.

The dyestuff used in this example is prepared by condensing 1-amino-4-(4' - aminoanilino)anthraquinone-2-sulphonic acid with 3,5-dinitrobenzoyl chloride in aqueous acetone solution at pH 7–8, reducing the nitro groups in the product with sodium sulphide in aqueous solution, and acylating the amino groups so formed with methacryloyl chloride in aqueous acetone solution at pH 7–8.

EXAMPLE 17

In place of the 0.03 part of dyestuff used in Example 9 there is used 0.03 part of 1-amino-4-[4'-N-acryloyl-N-($\beta$-acryloylaminoethylamino)anilino]anthraquinone - 2-sulphonic acid. The nylon is dyed a bright reddish blue shade possessing superior fastness to wet treatments compared with a similar dyeing in which the ammonium persulphate and sodium metabisulphite are omitted.

The dyestuff used in this example may also be used to dye wool by the methods described in Examples 7 and 10 when reddish blue shades having very good fastness to wet treatments are obtained.

The dyestuff used in this example may be prepared as follows:

A mixture of 4 parts of 1-amino-4-bromoanthraquinone-2-sulphonic acid, 5.2 parts of 4-(N-acryloyl-N-$\beta$-acryloylaminoethylamino)aniline, 4.2 parts of sodium bicarbonate, 30 parts of diethylene glycol, 70 parts of water, 0.4 part of cuprous chloride, and 0.4 part of cupric sulphate is stirred under a slow stream of nitrogen at 70–75° C. for 12 hours. The reaction mixture is diluted with water and acidified with dilute hydrochloric acid. The precipitate is filtered off and washed on the filter with warm dilute hydrochloric acid. The filter-cake is suspended in water at room temperature and neutralised by adding sodium carbonate. The product is isolated by adding sodium chloride, filtering off, washing on the filter with a little aqueous sodium chloride solution, and drying.

EXAMPLE 18

In place of the 0.03 part of the dyestuff used in Example 9 there is used 0.03 part of 1-amino-4-[2'-methyl-4'-

(N,N - bis - β - methacryloylaminoethyl)aminosulphonylanilino]anthraquinone-2-sulphonic acid when a reddish-blue shade possessing excellent fastness to wet treatments is obtained.

The dyestuff of this example is also applied to wool by the methods described in Examples 7 and 10 to give fast reddish-blue shades.

The dyestuff of this example is prepared by acylating 1-amino-4-[2'-methyl-4'-(N,N - bis - β - aminoethyl)aminosulphonylanilino]anthraquinone-2-sulphonic acid with methacryloyl chloride in aqueous acetone solution at pH 7–8. The 1-amino-4-[2'-methyl-4'-(N,N-bis-β-aminoethyl)aminosulphonylanilino]anthraquinone - 2 - sulphonic acid used above is prepared from 1-amino-4-(2'-methylanilino)anthraquinone-2,4'-disulphonic acid by an analogous procedure to that described in Example 1.

EXAMPLE 19

1 - amino - 4 - [3',5' - bis - (β-acryloylaminopropylsulphamoyl)anilino]anthraquinone-2-sulphonic acid is applied to cotton cloth by the methods of Examples 1, 2, and 3 when reddish-blue dyeings are obtained in high fixation. The dyeings possess very good fastness to severe washing.

The dyestuff used in this example may be prepared by condensing 1 - amino-4-(3',5'-bischlorosulphonylanilino) anthraquinone-2-sulphonic acid with 1,2-propylene diamine and acylating the product with acryloyl chloride in aqueous acetone by the method described in Example 1.

EXAMPLE 20

1 - amino - 4 - [3',5' - bis-(β-methacryloylaminopropylsulphamoyl)anilino]anthraquinone-2-sulphonic acid is applied to wool by the methods described in Examples 7 and 10 when reddish blue dyeings having very good fastness to wet treatments are obtained.

The dyestuff of this example is also applied to nylon fabrics by the methods described in Examples 8 and 9 when reddish blue dyeings are obtained showing superior fastness to wet treatments compared with similar dyeings in which the ammonium persulphate and sodium metabisulphite are omitted.

The dyestuff used in this example is prepared by the method described in Example 19 wherein the acryloyl chloride is replaced with an equivalent amount of methacryloyl chloride.

EXAMPLE 21

The dyestuff prepared as described below is applied to wool by the methods of Examples 7 and 10 when violet dyeings are obtained which have superior fastness to wet treatments compared with similar dyeings in which the ammonium persulphate and sodium metabisulphite or the hydrogen peroxide and thiourea are omitted.

The dyestuff used in this example is prepared by the following procedure:

A mixture of 100 parts of p-aminophenol and 25 parts of a 50% aqueous solution of potassium hydroxide is heated under a slow stream of nitrogen at 180–90° C. allowing the water to distil off. 25 parts of 1-amino-4-(4'-N - acetyl - N - methylaminoanilino)anthraquinone-2-sulphonic acid are added and the mixture is stirred at 185–195° C. for 2 hours. After cooling to room temperature, the mixture is diluted with water and the solid product is filtered off, washed with warm water, dilute aqueous sodium hydroxide solution, and more water. The product is purified by extraction into hot acetone followed by evaporation and drying.

4 parts of the 1-amino-2-(4'-aminophenoxy)-4-(4''-N-acetyl-N-methylaminoanilino)anthraquinone so obtained are disulphonated by stirring in 80 parts of 10% oleum at 45–50° C. for several hours. The product is isolated by conventional procedures and is then dissolved in 200 parts of water at the boil. 100 parts of a naphthalene-1-sulphonic acid solution as described in Example 1, are added and the mixture is stirred at the boil under reflux for 20 hours. After cooling to room temperature the precipitated product is filtered off and washed with dilute hydrochloric acid. The product prepared above is then acylated with methacryloyl chloride in aqueous solution at pH 7–8 by the method described in previous examples.

EXAMPLE 22

The dyestuff prepared as described below is applied to wool by the methods of Examples 7 and 10 when greenish-blue dyeings are obtained having very good fastness to wet treatments.

The dyestuff used in this example is prepared by the following procedure:

A mixture of 8.4 parts of 1-amino-2-chloro-4-(4'-N-acetyl-N-methylaminoanilino)anthraquinone, 7.1 parts of sodium 4-acetylaminobenzenesulphinate and 50 parts of dimethyl formamide is stirred at the boil under reflux for 20 hours and then cooled to 20–25° C. The mixture is poured into 150 parts of water and the precipitated product is filtered off, washed on the filter with water, and dried.

5.8 parts of the 1-amino-2-(4'-acetylaminophenylsulphonyl)-4'-(4''-N-acetyl-N - methylaminoanilino)anthraquinone so obtained are disulphonated by stirring in 100 parts of 12% oleum at 20–25° C. for 24 hours. The product is isolated by conventional procedures and is then dissolved in 200 parts of water at the boil. 100 parts of a naphthalene-1-sulphonic acid solution as described in Example 1 are added and the mixture is stirred at the boil under reflux for 20 hours. After cooling to room temperature the precipitated product is filtered off and washed with dilute hydrochloric acid. The product prepared above is then acylated with methacryloyl chloride in aqueous acetone solution at pH 7–8 by the method described in previous examples.

EXAMPLE 23

1-methylamino-4-[4'-N - (3'',5'' - bismethacrylolylamino-4''-methylbenzenesulphonyl)-N - methylaminoanilino] anthraquinone-2'-sulphonic acid is applied to nylon fabrics by the methods described in Examples 8 and 9 when blue dyeings are obtained having superior fastness to wet treatments compared with similar dyeings in which the ammonium persulphate and sodium metabisulphite are omitted.

The dyestuff of this example is applied to wool fabrics by the methods described in Examples 7 and 10 when blue dyeings are obtained having very good fastness to wet treatments.

The dyestuff used in this example is prepared by condensing 1 - methylamino - 4-(4'-methylaminoanilino)anthraquinone-2'-sulphonic acid with 2,6-diacetylaminotoluene-4-sulphonyl chloride, hydrolysing the acetylamino groups, and acylating the product with methacryloyl chloride by procedures analogous to those described in Example 4.

EXAMPLE 24

1-amino-2-methyl-4-[4' - N - (3'',5'' - bismethacryloylamino-4''-methylbenzenesulphonyl)-N - methylaminoanilino]anthraquinone-2'-sulphonic acid is applied to wool fabrics by the methods described in Examples 7 and 10 when reddish-blue dyeings are obtained having superior fastness to wet treatments compared with similar dyeings in which the ammonium persulphate and sodium metabisulphite or the hydrogen peroxide and thiourea are omitted.

The dyestuff used in this example may be prepared by the method described in Example 23 wherein the 1-methylamino-4-(4'-methylaminoanilino)anthraquinone - 2' - sulphonic acid is replaced by an equivalent amount of 1-amino-2-methyl-4 - (4' - methylaminoanilono)anthraquinone-2'-sulphonic acid.

In place of the dyestuff used above there is used 1-amino-2-bromo-4-[4'-N-(3'',5'' - bismethacryloylamino - 4''-methylbenzenesulphonyl) - N - methylaminoanilino]anthraquinone-2'-sulphonic acid, prepared by analogous pro-

EXAMPLE 25

1-amino-4-[3' - (3'',5''bisacryloylaminobenzoylamino) anilino]anthraquinone-2,4',5(or 8)trisulphonic acid mixture is applied to cotton fabrics by the methods of Examples 1, 2 and 3 to give greenish-blue dyeings having very good fixation and fastness to severe washing.

The dyestuff used in this example is prepared by the method described in Example 6 wherein the 1-amino-4-(3'-aminoanilino)anthraquinone-2,4'-disulphonic acid is replaced by an equivalent amount of 1-amino-4-(3'-aminoanilino)anthraquinone-2,4',5(or 8)-trisulphonic acid mixture.

EXAMPLE 26

In place of the 0.0375 part of the dye used in Example 7 there is used 0.0375 part of 1-amino-4-[4'-(3'',5''-bismethacryloylaminobenzoylamino)anilino]anthraquinone-2,5(or 8)-disulphonic acid mixture. The wool is dyed a greenish-blue shade having superior fastness to wet treatments compared with similar dyeings in which the ammonium persulphate and sodium metabisulphite or the hydrogen peroxide and thiourea or omitted.

The dyestuff used in this example is prepared by the method described in Example 6 wherein the 1-amino-4-(3'-aminoanilino)anthraquinone-2,4'-disulphonic acid is replaced by an equivalent amount of 1-amino-4-(4'-aminoanilino)anthraquinone-2,5(or 8)-disulphonic acid mixture and the acryloyl chloride is replaced by an equivalent amount of methacryloyl chloride.

EXAMPLE 27

1-amino-4-[4'-(2'',4'' - bismethacryloylaminophenoxy) anilino]anthraquinone-2-sulphonic acid is applied to wool fabrics by the methods described in Examples 7 and 10 when blue dyeings are obtained which possess superior fastness to wet treatments compared with similar dyeings in which the ammonium persulphate and sodium metabisulphite or the hydrogen peroxide and thiourea are omitted.

The dyestuff of this example is also applied to nylon fabrics by the methods of Examples 8 and 9 when blue dyeings having very good fastness to wet treatments are obtained.

The dyestuff used in this example may be prepared as follows:

A mixture of 4 parts of the sodium salt of 1-amino-4-bromoanthraquinone-2-sulphonic acid, 5.5 parts of 4-(2',4'-dinitrophenoxy)aniline, 4.2 parts of sodium bicarbonate, 30 parts of β-ethoxyethanol, 60 parts of water, 0.5 part of cuprous chloride and 0.5 part cupric sulphate is stirred under a slow stream of nitrogen of 65–70° C. for 24 hours. The reaction-mixture is cooled to room temperature and acidified with hydrochloric acid. The precipitate is filtered off and washed on the filter with warm dilute hydrochloric acid. The filter-cake is suspended in water, made alkaline by the addition of sodium carbonate, and filtered again. The filter-cake is dissolved in acetone and the product is precipitated by adding 2 N-hydrochloric acid, filtered off, and washed with water until neutral in reaction.

The product described above is suspended in 50 parts of water at 60° C. and dilute aqueous sodium hydroxide solution is added until the mixture is alkaline to Brilliant Yellow indicator. 50 parts of ethanol are added and the stirred mixture is treated with a solution of 7.3 parts of sodium sulphide crystals in 15 parts of water. The mixture is stirred at 60° C. for 30 minutes, cooled to 10° C. and acidified with dilute hydrochloric acid. The product is filtered off, washed well with water and dried. The 1-amino - 4 - [4' - (2'',4'' - diaminophenoxy)anilino]anthraquinone-2-sulphonic acid so obtained is acylated with methacryloyl chloride in aqueous acetone at pH 7–8 by an analogous procedure to that described in Example 4.

EXAMPLE 28

In place of the 0.03 part of the dyestuff used in Example 9 there is used 0.03 part of 1-amino-4-[3'-(N-acryloyl - N-β-acryloylaminoethylamino)methylanilino] anthraquinone-2-sulphonic acid. The nylon is dyed a bright blue shade possessing superior fastness to wet treatments compared with a similar dyeing in which the ammonium persulphate and sodium metabisulphite is omitted.

The dyestuff used in this example is also applied to wool fabrics by the methods described in Examples 7 and 10 when blue dyeings are obtained having very good fastness to wet treatments.

In place of the 0.03 part of the dyestuff used in the above example there is used 0.03 part of 1-amino-4-[3' - (N-acryloyl-N-β-acryloylaminoethylamino)methyl-4'-methylanilino]anthraquinone-2-sulphonic acid when slightly but similarly fast dyeings are obtained.

The dyestuffs used in this example are prepared by the method described in Example 17 wherein the 5.2 parts of 4 - (N-acryloyl-N-β-acryloylaminoethylamino) aniline are replaced by 5.45 parts of 3-(N-acryloyl-N-β-acryloylaminoethylamino)methylaniline and 5.75 parts of 3-(N-acryloyl-N-β-acryloylaminoethylamino)methyl-4-methylaniline respectively.

EXAMPLE 29

1 - amino - 4-[β-(2',4'-bismethacryloylaminophenoxy) ethylamino]anthraquinone-2-sulphonic acid is applied to nylon fabrics by the methods described in Examples 8 and 9 to give blue dyeings having very good fastness to wet treatments.

The dyestuff used in this example is also applied to wool by the methods described in Examples 7 and 10 to give blue dyeings having very good fastness to wet treatments.

The dyestuff used in this example is prepared by an analogous method described for the dyestuff used in Example 27 wherein the 5.5 parts of 4-(2',4'-dinitrophenoxy)aniline are replaced by 4.5 parts of β-(2,4-dinitrophenoxy)ethylamine.

EXAMPLE 30

In place of the 0.03 part of the dyestuff used in Example 9 there is used 0.03 part of 1-amino-4-[3'-(N,N-bis - β - methacryloyloxyethyl)aminosulphonylanilino]anthraquinone-2-sulphonic acid. The nylon fabric is dyed a reddish-blue shade which possesses superior fastness to wet treatments compared with a similar dyeing in which the sodium metabisulphite and ammonium persulphate are omitted.

The dyestuff of this example is also applied to wool by the methods described in Examples 7 and 10 to give reddish-blue dyeings having very good fastness to wet treatments.

The dyestuff used in this example may be obtained by acylating 1-amino-4-[3'-(N,N-bis-β-hydroxyethyl)aminosulphonylanilino]anthraquinone-2-sulphonic acid with methacryloyl chloride in aqueous medium in the presence of an alkaline agent at 50–60° C.

EXAMPLE 31

5 parts of knitted bulked nylon 6 fabric or knitted bulked nylon 66 fabric ("Banlon") are agitated in a dyebath containing 1 part of a 4% dye dispersion [obtained by gravel milling 4 parts of 1-β-hydroxyethylamino-4-[4'-(3'',5'' - bismethacryloylaminobenzoylamino)anilino] anthraquinone and 4 parts of the sodium salt of methylene dinaphthalene surphonic acid in 92 parts of water], 0.075 part of cetyl/oleyl sodium sulphate, 0.075 part of the disodium salt of methylene dinaphthalene sulphonic acid, and 150 parts of water. The bath is agitated and the temperature is raised to 100° C. and dyeing is continued for 60 minutes at 100° C. The fabric is removed, rinsed in water, and placed in a separate bath containing 2 parts of a 5% solution of ammonium persulphate in water, 2 parts of a 5% solution of sodium metabisulphite in water, and 150 parts of water. The fabric is agitated, the temperature of the bath is raised to 100° C., and treatment at 100° C. is continued for a further 30 minutes. The fabric is removed from the bath, rinsed in water, and treated in a bath containing 3 parts of the condensate of nonylphenol with 8 moles of ethylene oxide in 1000 parts of water for 5 minutes at 50° C., rinsed, and dried.

The fabric is dyed a blue shade having improved fastness to extraction with boiling pyridine, to washing, and to dry heat treatment compared with a similar piece of fabric dyed and treated as above but with the ammonium persulphate and sodium metabisulphite omitted.

In an alternative process the dyed fabric is rinsed and placed in a second bath containing, in place of the ammonium persulphate and sodium metabisulphite, 9 parts of a 10% (w./v.) solution of azobisisobutyronitrile in acetone, 0.15 part of cetyl/oleyl sodium sulphate, and 300 parts of water and set at 50° C. The temperature is raised to 90° C. and the treatment is continued at this temperature for 60 minutes, whilst the fabric is continuously stirred.

The fabric is removed from the bath, rinsed in water, and treated in a bath containing 3 parts of the condensate of nonylphenol with 8 moles of ethylene oxide in 1000 parts of water for 5 minutes at 50° C., rinsed, and dried.

The fabric is dyed a blue shade having improved fastness to extraction with boiling pyridine, to washing, and to dry heat treatment compared with a similar piece of fabric dyed and treated as above but with the azobisisobutyronitrile omitted.

The dyestuff used in this example is prepared by acylating 1-β-hydroxyethylamino-4-(4'-aminoanilino)anthraquinone with 3,5-dinitrobenzoyl chloride in acetone solution, reducing the nitro groups with sodium sulphide in water, and acylating the amino groups so obtained with methacryloyl chloride in aqueous acetone, by methods similar to those described in the preceding examples.

EXAMPLE 32

In place of the dyestuff used in Example 31 there is used 1 part of a 4% dye dispersion (prepared as described in Example 31) of the dyestuff obtained as described below. The nylon fabric is dyed in a pink shade having improved fastness to boiling pyridine, to washing, and to dry heat treatment compared with similar dyeings in which the ammonium persulphate and sodium metabsulphite or the azobisisobutyronitrile are omitted.

The dyestuff used in this example may be obtained as follows:

8 parts of 1-amino-4-hydroxy-2-phenoxyanthraquinone are added slowly to 30 parts of chlorosulphonic acid stirred at 20–25° C. Stirring is continued at this temperature for a further 2 hours and then the solution is poured on to ice. The precipitated sulphonchloride is filtered off and washed well with ice-water until only weakly acidic in reaction. The filter cake is added to a stirred solution of 12.5 parts of diethylene triamine in 50 parts of acetone at 20–25° C. The mixture is stirred at this temperature for 2 hours and then heated to the boil and boiled under reflux for 1 hour. After cooling to room temperature, the precipitated product is filtered off, washed with methanol and water, and dried. The product prepared by the above method is acylated with methacryloyl chloride by a method similar to those described in the preceding examples.

What we claim is:

1. A process for the coloration of fibrous materials or polymeric films which comprises treating the fibrous material or polymeric film with a solution or suspension of an anthraquinone dyestuff having a formula selected from the group consisting of:

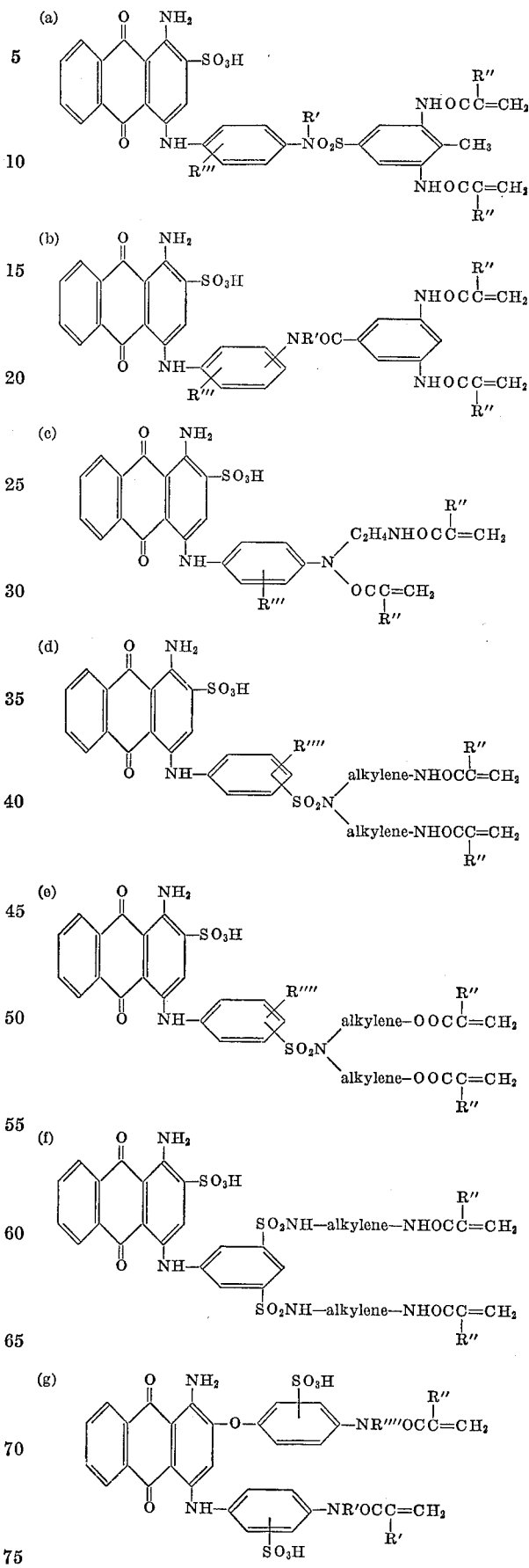

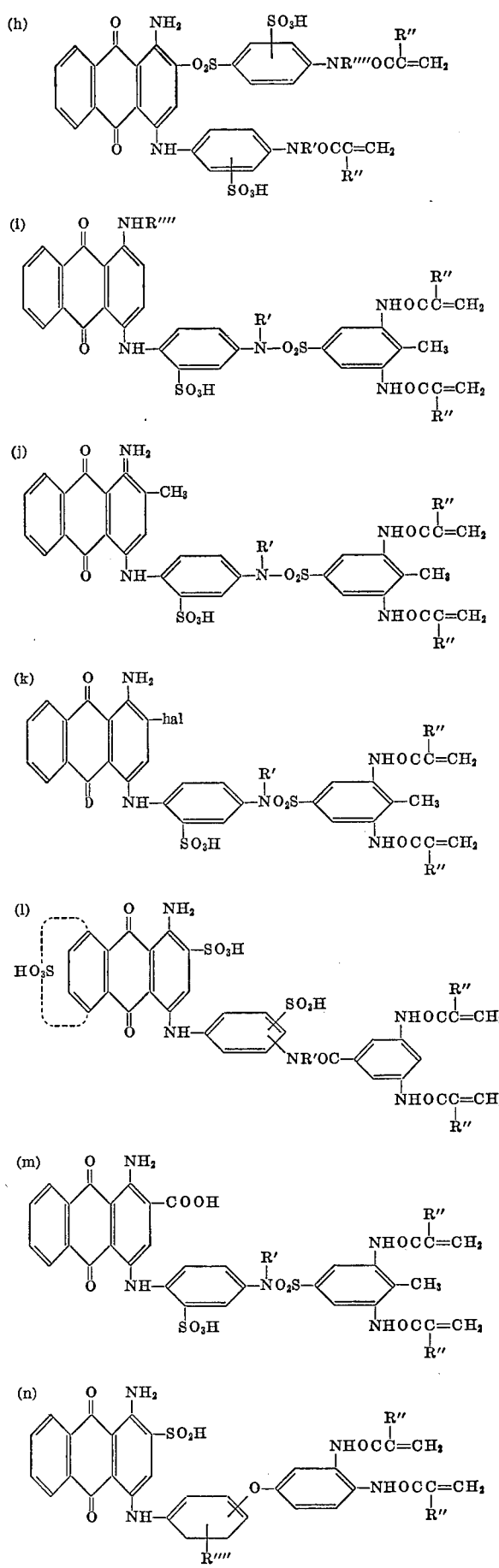

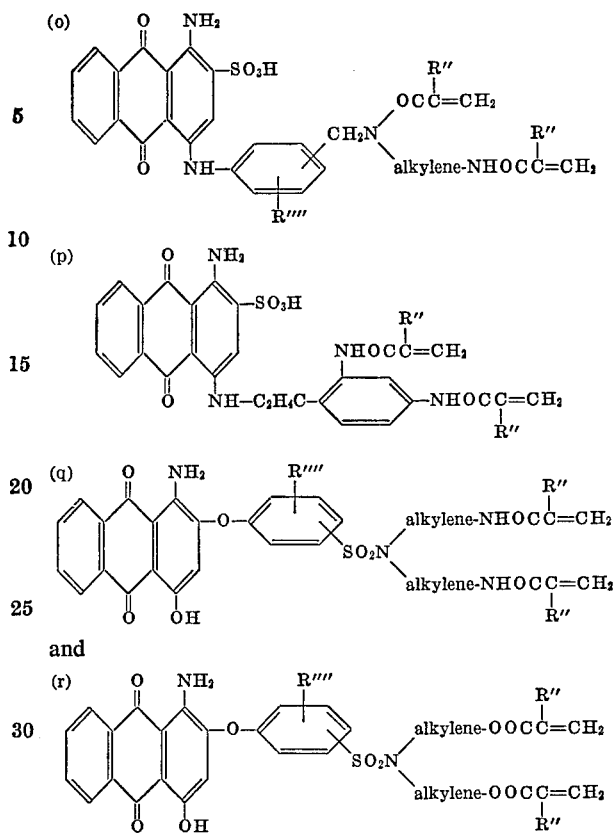

wherein R' is selected from the group consisting of hydrogen and lower alkyl, R'' is selected from the group consisting of hydrogen and —CH₃, R''' is selected from the group consisting of hydrogen and —SO₃H, R'''' is selected from the group consisting of hydrogen and lower alkyl, alkylene is lower alkylene and hal is selected from the group consisting of chlorine and bromine, said treatment being carried out in conjunction with a polymerization catalyst.

2. The process of claim 1 wherein said anthraquinone dystuff has structural Formula $d$ and wherein the $$-SO_2N<$$

link is meta to the —NH—.

3. The process of claim 1 wherein said anthraquinone dyestuff has the structural Formula $e$ and wherein the —SO₂N< link is meta to the —NH—.

4. The process of claim 1 wherein the anthraquinone dyestuff has the structural Formula $f$ and wherein said alkylene is selected from the group consisting of ethylene and propylene.

5. The process of claim 1 wherein the anthraquinone dyestuff has the structural Formula $l$ and wherein the benzoylamino and sulphonic acid groups, attached to the phenyl nucleus which in turn is attached to the anthraquinone nucleus through a —NH— link, between them occupy the m and p positions relative to said —NH— link.

6. The process of claim 1 wherein the anthraquinone dyestuff has the structural Formula $n$ and wherein the —O— link is m or p to the —NH—link.

7. The process of claim 1 wherein the anthraquinone dyestuff has the structural Formula $o$ and wherein the —CH₂N< link is m or p to the —NH— link.

8. The process of claim 1 wherein said dyestuff is initially applied to the fibrous material or polymeric film and which is thereafter treated with said polymerization catalyst.

9. The process of claim 1 wherein the fibrous material or polymeric film is treated simultaneously with the dyestuff and polymerization catalyst after which the catalyst is activated.

10. The process of claim 1 wherein the polymerization catalyt is used in an amount of from 1–500% by weight based on the weight of the dyestuff.

References Cited

UNITED STATES PATENTS 3,501,505 3/1970 Buehler _____ 260—372

FOREIGN PATENTS 858,184 1/1961 Great Britain.

DONALD LEVY, Primary Examiner
B. BETTIS, Assistant Examiner

U.S. Cl. X.R.

8—39, 54, 178, 1.216, 1.247